United States Patent
Studebaker et al.

(10) Patent No.: US 7,181,313 B2
(45) Date of Patent: Feb. 20, 2007

(54) SCALABLE COMPOSITE RECTANGULAR/CYLINDRICAL AUTOMATED DATA STORAGE LIBRARY SYSTEM

(75) Inventors: Thomas J. Studebaker, Boulder, CO (US); William R. Brennan, Jr., Longmont, CO (US); Chad A. Follmar, Boulder, CO (US); Everette C. Van Wert, Lafayette, CO (US); William H. Vermeer, Longmont, CO (US)

(73) Assignee: Qualstar Corporation, Simi Valley, CA (US)

( * ) Notice: Subject to any disclaimer, the term of this patent is extended or adjusted under 35 U.S.C. 154(b) by 609 days.

(21) Appl. No.: 10/463,896

(22) Filed: Jun. 17, 2003

(65) Prior Publication Data

US 2004/0257924 A1 Dec. 23, 2004

(51) Int. Cl.
*G06F 7/00* (2006.01)
(52) U.S. Cl. .................. 700/214; 700/218; 414/331.02; 414/331.03; 414/331.04; 414/331.05
(58) Field of Classification Search ................ 700/213, 700/214, 218; 414/331.02, 331.03, 331.04, 414/331.05
See application file for complete search history.

(56) References Cited

U.S. PATENT DOCUMENTS

| | | | | |
|---|---|---|---|---|
| 4,937,690 A | * | 6/1990 | Yamashita et al. | 360/92 |
| 5,345,350 A | * | 9/1994 | Ellis et al. | 360/92 |
| 5,471,561 A | * | 11/1995 | Cowgill et al. | 700/247 |
| 6,230,075 B1 | * | 5/2001 | Nishijo et al. | 700/214 |
| 6,816,332 B2 | * | 11/2004 | Goodman et al. | 360/69 |
| 6,968,257 B2 | * | 11/2005 | Ngo | 700/214 |
| 2004/0167662 A1 | * | 8/2004 | Goodman et al. | 700/213 |

* cited by examiner

*Primary Examiner*—Khoi H. Tran
(74) *Attorney, Agent, or Firm*—Patton Boggs LLP

(57) ABSTRACT

This system includes a base unit having an array of data storage locations mounted in a rectangular form factor along a back wall of the housing and at least one read/write device. The robotic mechanism includes a stationary vertical shaft on which is mounted on a horizontal track, movable in the vertical direction. The horizontal track extends from end to end of the base unit housing. The robotic mechanism includes a rotatable gripper that moves on the horizontal track and swivels on a pivot about an axis that is parallel to the vertical shaft to provide access to all interior surfaces of the base unit housing where data storage locations reside. An expansion module, comprising a rotary carousel of data storage locations, can be connected to either end of the base unit which enables the robotic mechanism to access the data storage elements within the expansion module without modification.

26 Claims, 15 Drawing Sheets

SCALABLE COMPOSITE RECTANGULAR/CYLINDRICAL AUTOMATED DATA STORAGE LIBRARY SYSTEM

FIELD OF THE INVENTION

The invention relates to automated data storage library systems and in particular to a scalable composite rectangular/cylindrical library system that provides a simple and flexible architecture for serving various customer needs.

PROBLEM

It is a problem in the field of automated data storage library systems to provide a simple, inexpensive method to incrementally increase the data storage capacity of the library system while also retaining an acceptable access time to retrieve a data storage element and mount it in a data read/write device.

Automated data storage library systems function to provide a host computer with access to a plurality of data storage elements (such as tape cartridges, tape cassettes, disks, and the like). The automated data storage library system includes an array of data storage locations, each of which houses a data storage element, and uses a robotic mechanism to move the data storage element between its storage location and a read/write device. There are two architectures used in automated library systems: cylindrical and rectangular.

The cylindrical architecture of an automated data storage library system provides an array of data storage locations that are arranged in a cylindrical shape. The robotic mechanism may either be stationary while the cylindrical array of data storage locations rotates or the robotic mechanism may rotate around or within the cylindrical array of data storage locations. In the case where dual concentric cylindrical arrays of data storage locations are employed, the robot may rotate between the two cylinders at the same time. The use of a cylindrical array of data storage locations, or dual concentric cylinders of data storage locations, provides a high density data storage capacity for an automated data storage library system. However, a problem with this architecture is that the user can not incrementally increase the data storage capacity of the library system. Once the cylindrical array of data storage locations is fully occupied, the customer cannot expand the capacity of the automated library system without adding an entire new library, with a full complement of data storage locations and complete robotic mechanism. Therefore, there is no ability to incrementally increase the storage capacity of these library systems. A further limitation of this architecture is that the speed of the data storage element retrieval operation is limited by the use of a single robotic mechanism. To gain speed results in the use of expensive robotic mechanisms.

The more common automated data storage library system architecture is the rectangular architecture, in which the data storage locations are configured in a flat plane in the horizontal and vertical directions (also termed an X-Y configuration). The robotic mechanism travels on a continuous horizontal track along the face of this array of data storage locations and includes a retrieval mechanism that travels vertically up and down to transport the data storage elements between a data storage location and a selected read/write device. The capacity of these rectangular automated data storage library systems, while not as dense as the cylindrical architecture, can be incrementally increased by linearly attaching additional data storage modules to the existing array of data storage modules. In this manner, the capacity of the automated data storage library system can be managed in discrete blocks, as the needs of the customer change.

A first problem with attaching additional data storage modules in a linear mode to an existing rectangular library system is the complexity required for the interconnection among the data storage modules. A typical rectangular architecture automated data storage library system 10 is shown in FIG. 3 and includes a robotic mechanism 30 that travels along the X-axis on a set of stationary horizontal tracks 32, 34 to serve an existing set of data storage modules 14, 16, 18. To add an expansion module 12 that includes a plurality of data storage locations requires extension of the horizontal tracks 32, 34 on which the robotic mechanism 30 travels into the added data storage module 12. This change requires modification of the drive system, additional cabling to accommodate the extended distance traveled by the robotic mechanism 30, and precise alignment of the expanded linear horizontal tracks 32, 34 in all three dimensions. In addition, as data storage modules are added to the automated data storage library system 10, the access time for the robotic mechanism to retrieve a data storage element and mount it in a data read/write device increases. One traditional solution to this access time problem is the addition of an additional robotic mechanism 30, operating on the same set of stationary horizontal tracks 32, 34. The use of multiple robotic mechanisms 30 on the same set of tracks results in another problem of coordinating the operation of the multiple robotic mechanisms 30 to ensure that there are no collisions and that all data storage locations are served.

Thus, existing automated data storage library systems either cannot incrementally expand their data storage capacity or can do so, but at the cost of complexity required to expand the automated data storage library system, the increased access time to retrieve a data storage element and mount it in a data read/write device, and the need to coordinate the operation of multiple robotic mechanisms, operating on the same set of stationary horizontal tracks.

SOLUTION

The present scalable automatic data storage library system solves the above described problems and provides an advance in the art of automated data storage library systems by providing a composite rectangular-cylindrical architecture that overcomes the problems with existing library systems. The scalable automatic data storage library system includes a base unit housing having an array of data storage locations mounted in a rectangular form factor along a back wall of the housing and at least one read/write device. An X-Y-Z robotic mechanism located in the base unit includes a stationary vertical shaft (Y-axis) on which is mounted on a horizontal track (X-axis), located in front of the array of data storage locations, and movable in the vertical direction along the stationary shaft. The horizontal track extends from one end of the base unit housing to the other end of the base unit housing, for transporting individual data storage elements between their assigned data storage locations and the read/write devices. The robotic mechanism includes a rotatable gripper that moves end-to-end on the horizontal track and swivels on a pivot about an axis that is parallel to the vertical shaft to provide access to all interior surfaces of the base unit housing where data storage locations reside, reaching in the Z-axis direction to access the data storage elements.

The base unit may include at least one access door located on the front wall of the base unit housing, which may contain additional data storage locations. These doors also provide the operator with access to the robotic mechanism for maintenance purposes, access to the read/write devices for manual operation and access to data storage locations for bulk loading and unloading of data storage elements. The front of the base unit housing may include a stationary panel incorporating one or more I/O ports, each containing a removable magazine of data storage locations. The I/O ports allow the operator to import and export one or more magazines of data storage elements without interrupting the operation of the robotic mechanism. The rotatable gripper also accesses the data storage locations in the access doors and within the magazines to move data storage elements between the I/O ports and the array of data storage locations. A control panel can be mounted on the front of the base unit housing to allow the operator to control the operation and configuration of the base unit.

An expansion module, comprising a rotary carousel having a plurality of columns of outwardly facing data storage locations arranged around the circumference of the carousel, can be connected to either end of the base unit to allow the robotic mechanism to access the data storage elements that are stored in the data storage locations in the expansion module. Installation of the expansion module only requires the removal of the end cover of the base unit housing and the attachment of the expansion module to the base unit housing. There are no additional tracks or robotic mechanisms to install since the rotatable gripper mechanism reaches into the expansion module to retrieve a data storage element but the horizontal track does not need to extend into the expansion module, so the expansion of the scalable automated data storage library system is a simple process. The data storage element retrieval time is not impacted by the addition of the expansion module since the robotic mechanism has no additional travel distance to reach the carousel of data storage locations and the rotation of the carousel overlaps with the movement of the robotic mechanism in the base unit. Thus, the expansion module presents only one column of data storage locations at a time to the rotatable gripper mechanism, which rotates to align with the column of data storage locations as it is being simultaneously translated in the horizontal and vertical directions to be positioned opposite a selected data storage location in the column of data storage locations. An interface in the expansion module allows a control processing system within the base unit to control and coordinate the operation of the robotic mechanism and the rotary carousel.

To further increase the storage capacity of the scalable automated data storage library system, a second expansion module may be connected to the other end of the base unit housing. Alternatively, an expansion module may be centrally located between two base units wherein each robotic mechanism within each base unit has access to the shared storage locations within the expansion module. The combination of expansion module(s) and base unit(s) can be architected in many configurations, to thereby incrementally increase the storage capacity of the scalable automated data storage library system. In all of these configurations, each robotic mechanism travels only within the original extent of their base unit and the rotatable gripper mechanism reaches into the adjacent expansion module(s) to move data storage elements between the expansion module(s) and the read/write device(s) within the base unit.

DETAILED DESCRIPTION

The present scalable automated data storage library system summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

Scalable Automated Data Storage Library System

Figure 1:
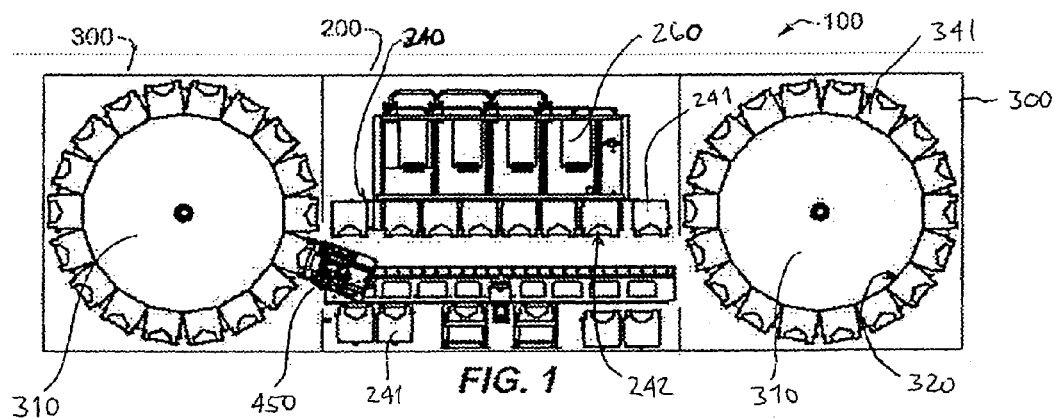
FIG. 1 illustrates a top down view of implementation details of the present scalable automated data storage library system.
Figure 2A:
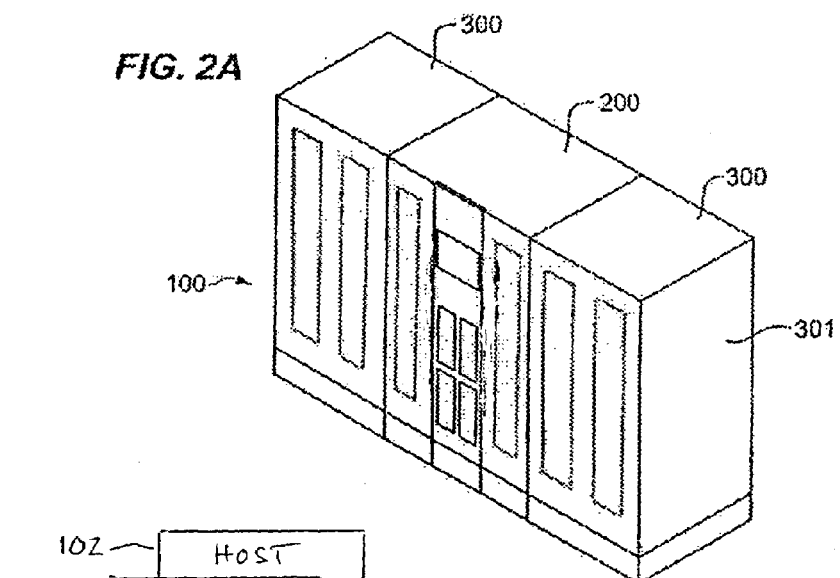
FIGS. 2A–2B illustrate perspective and schematic views, respectively, of the present scalable automated data storage library system.
Figure 2B:
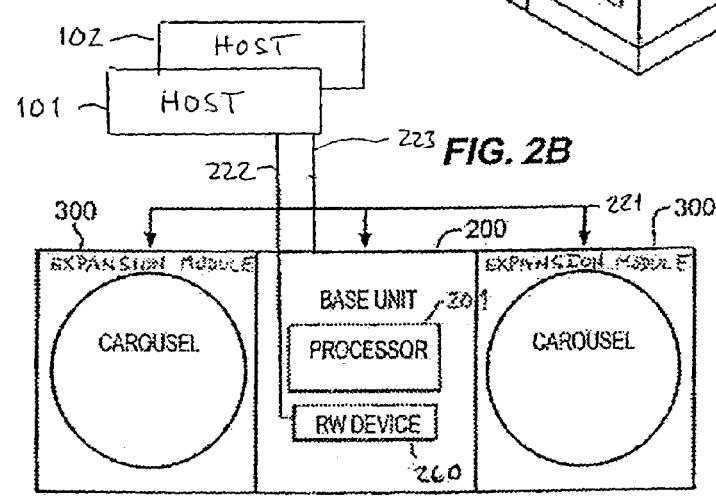
Figure 3:
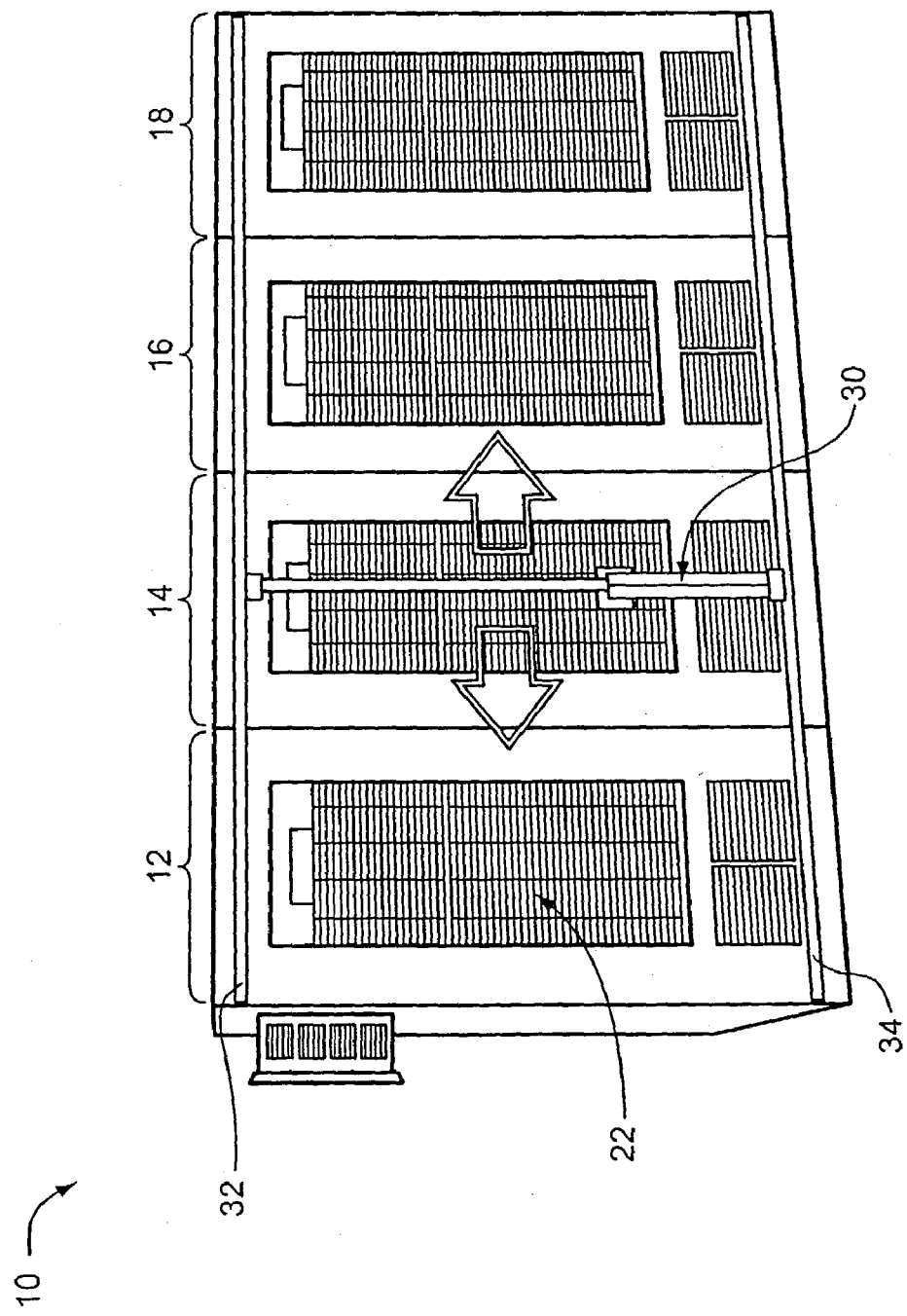
FIG. 3 illustrates a prior art automated data storage library system with banks of tape cartridge storage locations.
Figure 5:
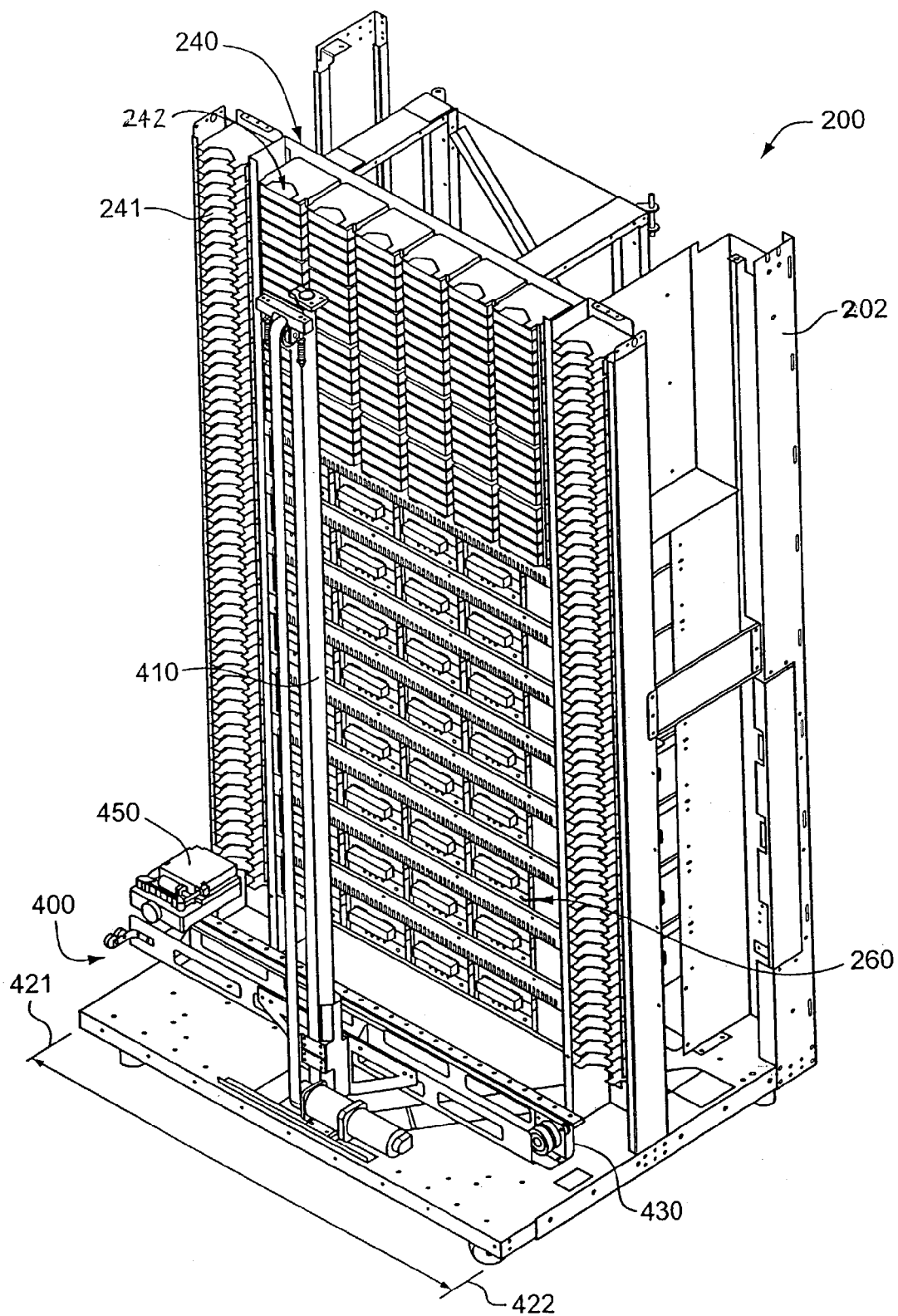
FIG. 5 illustrates a perspective view of the interior of the scalable automated data storage library system with the covers and front panel removed, showing the back wall and the robotic mechanism.

FIG. 1 illustrates a top down view of implementation details of one embodiment of the present scalable automated data storage library system 100 which consists of a base unit 200 and two expansion modules 300. FIG. 2A illustrates a perspective view of the present scalable automated data storage library system 100 while FIG. 2B represents a schematic view of the present scalable automated data storage library system 100. FIG. 5 illustrates a perspective view of the base unit 200 of the scalable automated data storage library system 100, illustrating the interior with the covers and front panel removed, showing the back wall and the robotic mechanism.

The automated data storage library system 100 is connected to one or more host computers 101, 102 via control path 223, and base unit 200 is operable to mount data storage elements 242 into read/write devices 260 to enable the host computers 101, 102 to control the operation of the read/write devices 260 to read and write data on to and from the rewriteable media contained within the data storage elements 242 via data path 222. The automated data storage library system 100 includes a base unit housing 202 having an array of data storage locations 241 mounted in a rectangular form factor along a back wall 240 of the housing 202 and at least one read/write device 260. An X-Y-Z robotic mechanism 400 includes a stationary vertical shaft 410 on which is mounted a horizontal track 430, located in front of the array of data storage locations and read/write devices 260. The horizontal track 430 extends from one end 421 of the base unit housing to the other end 422 of the base unit housing, for transporting individual data storage elements 242 between their assigned data storage locations 241 and the read/write devices 260. The robotic mechanism 400 includes a rotatable gripper 450 that traverses horizontal track 430, which moves in a vertical direction on the vertical shaft 410. The rotatable gripper 450 swivels about an axis that is parallel to the vertical shaft 410 to provide access to all interior surfaces of the base unit housing where data storage locations 241 and read/write devices 260 reside, reaching in the Z-axis direction to access the data storage elements 242.

This embodiment of the scalable automated data storage library system 100 includes a base unit 200, interconnected via local control path 221 to two expansion modules 300, one connected to the base unit 200 at either end thereof. Alternatively, a single expansion module 300 can be connected to the base unit 200. The expansion module 300 comprises a rotary carousel 310 having a plurality of columns of outwardly facing data storage locations 341 arranged around the circumference (surface 320) of the rotary carousel 310 and can be used to incrementally increase the storage capacity of the base unit 200 without requiring the addition of any robotic mechanism. The side cover 301 in FIG. 4A of the base unit housing 202 (FIGS. 4A & 5) is removed when the expansion module 300 is connected to the base unit 200 to allow the base unit robotic mechanism 400 to access the data storage locations 341 located within the expansion module 300 without modifying or extending the horizontal track 430 of the existing robotic mechanism 400 of the base unit 200. Therefore, the present scalable automated data storage library system 100 eliminates the addition of hardware, cabling, and the expenditure of the time to implement complex alignment procedures and modifications required for expanding prior art data automated data storage library systems by allowing the base unit robotic mechanism 400 to access storage locations 341 within the expansion module 300.

Base Unit

Figure 4A:
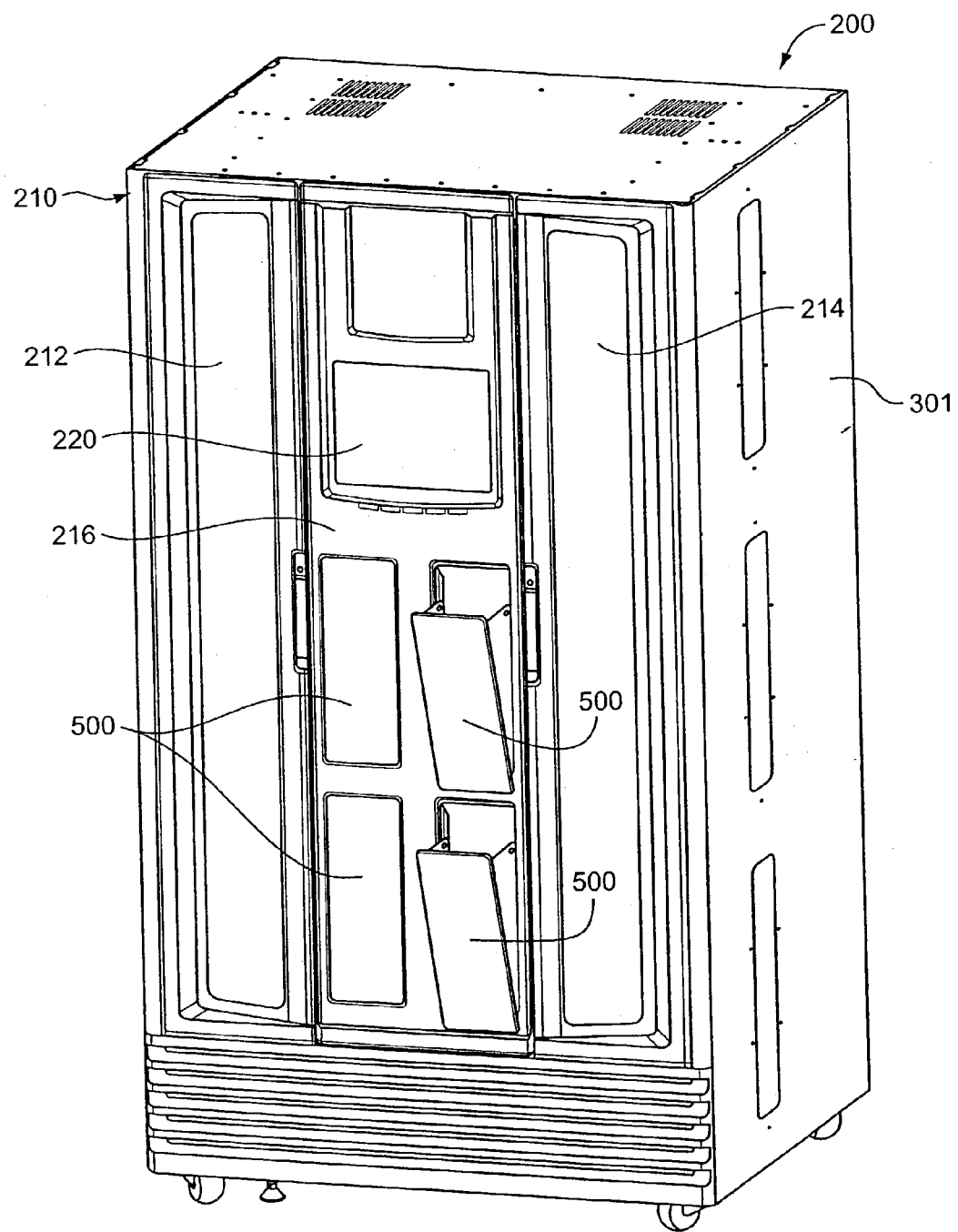
FIG. 4A illustrates a perspective view of a base unit according to the present scalable automated data storage library system and FIG. 4B illustrates a perspective view of the interior of the scalable automated data storage library system showing the front wall and the robotic mechanism.
Figure 4B:
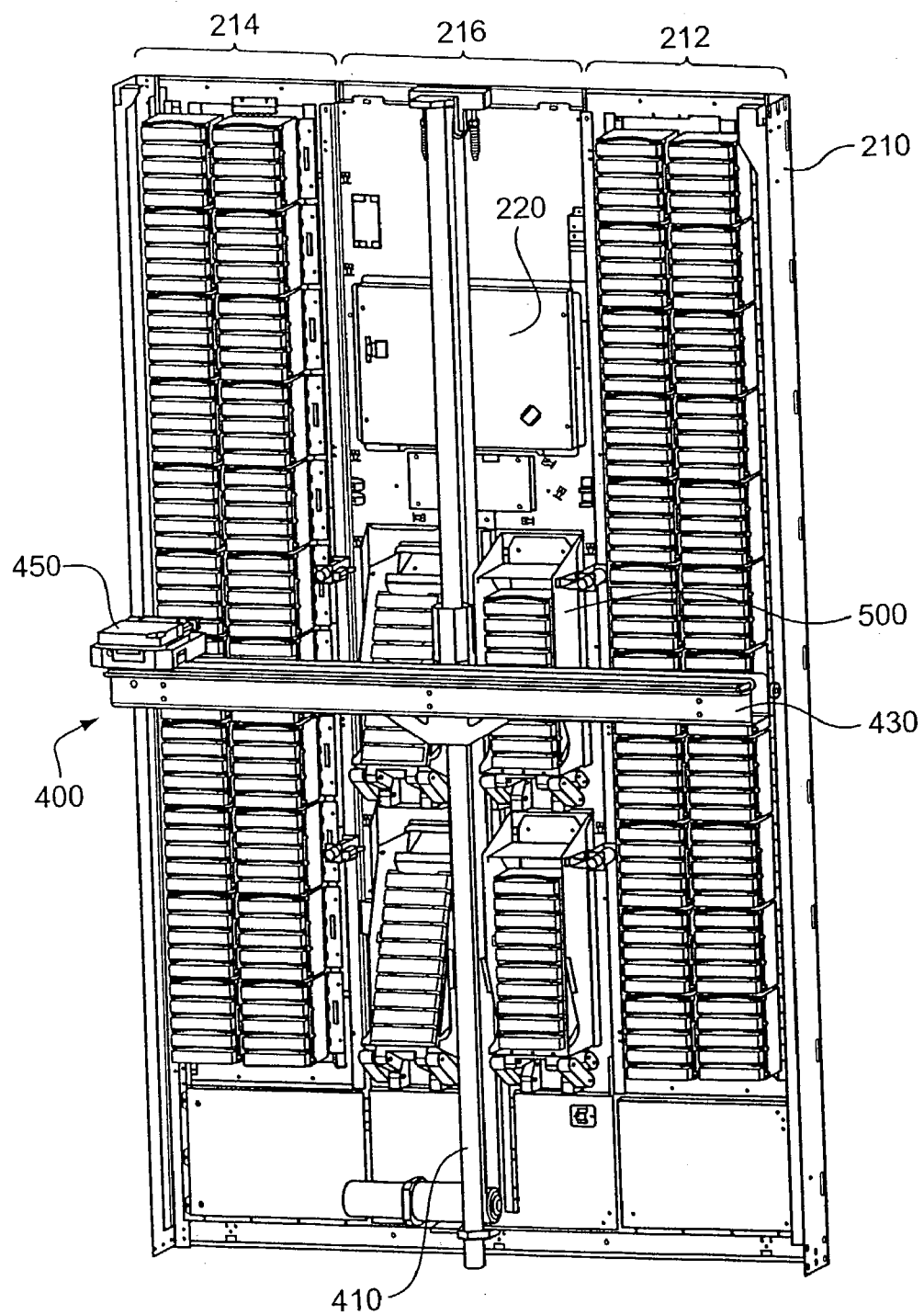
Figure 6:
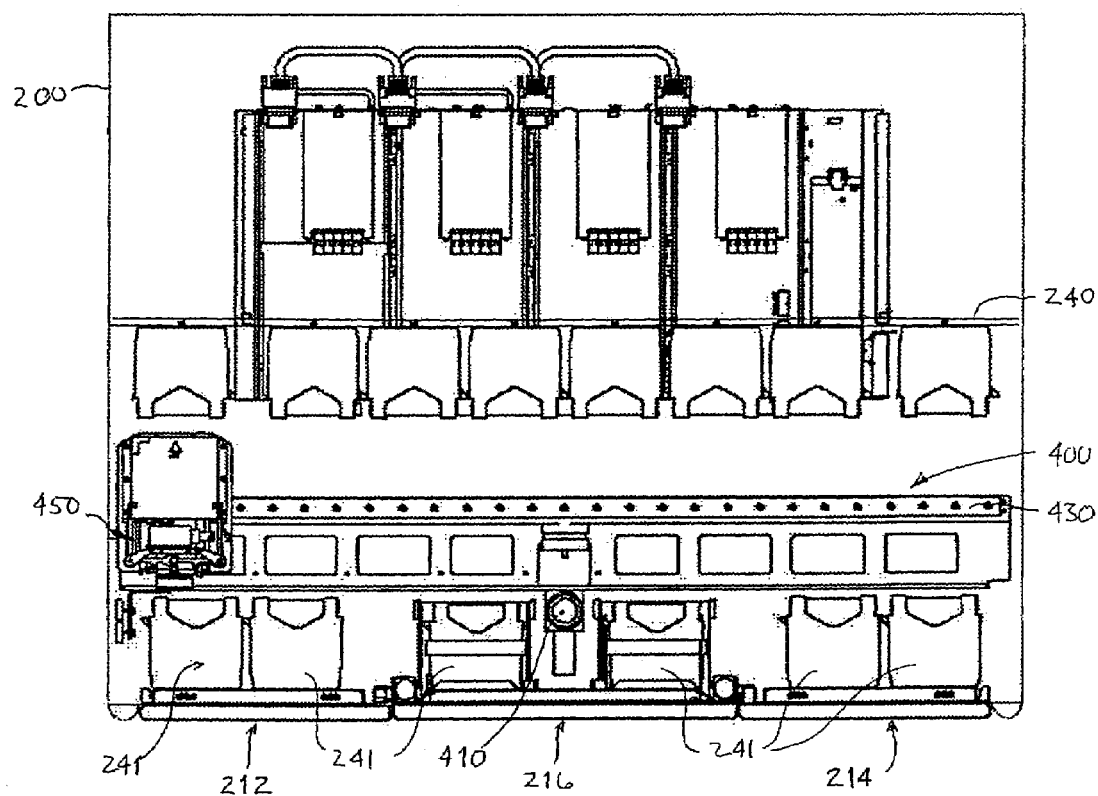
FIG. 6 illustrates a top view of the base unit with the left and right front doors in a closed location.

FIG. 4A illustrates a perspective view of a base unit according to the present scalable automated data storage library system and FIG. 4B illustrates a perspective view of the interior of the scalable automated data storage library system showing the front wall and the robotic mechanism. FIG. 6 illustrates a top view of the base unit with the left and right front doors in a closed location.

The base unit 200 may include one or more front access doors 212, 214 on the front wall 210 to permit bulk loading and unloading of data storage elements and to provide access for maintaining the internal robotic mechanism. The center front panel 216, located between the left and right front access doors, 212 and 214 respectively, may also include a control panel 220 to allow the operator to configure, to control the operation of, or obtain status from, the data automated data storage library system base unit 200. The center front panel 216, shown in FIGS. 4A and 8, may also include one or more I/O ports 500 for importing and exporting a magazine of data storage elements as is described below.

Internally, the base unit 200 includes rack space for operational components such as a power supply and a control processing system including memory for controlling operation of the base unit 200 and interconnected expansion modules 300. Base unit 200 also includes a back wall 240 of data storage locations 241 for housing a plurality of data storage elements 242 and data read/write devices 260 as illustrated in FIG. 5. Additional storage locations may be located on the interior center front panel 216 and on the interior of the left and right front access doors, 212 and 214 respectively (FIG. 4B). In this example, a robotic mechanism 400 moves the data storage elements 242 among the back wall 240 of data storage locations, the center front panel 216, including the I/O ports 500, and the right and left doors 212 and 214 and the data read/write devices 260. The rotatable gripper 450 attached to the robotic mechanism 400 swivels about an axis that is parallel to the vertical shaft 410 to provide access to all interior surfaces of the base unit housing where data storage locations 241 and read/write devices 260 reside, reaching in the Z axis direction to access the data storage elements 242.

Figure 7:
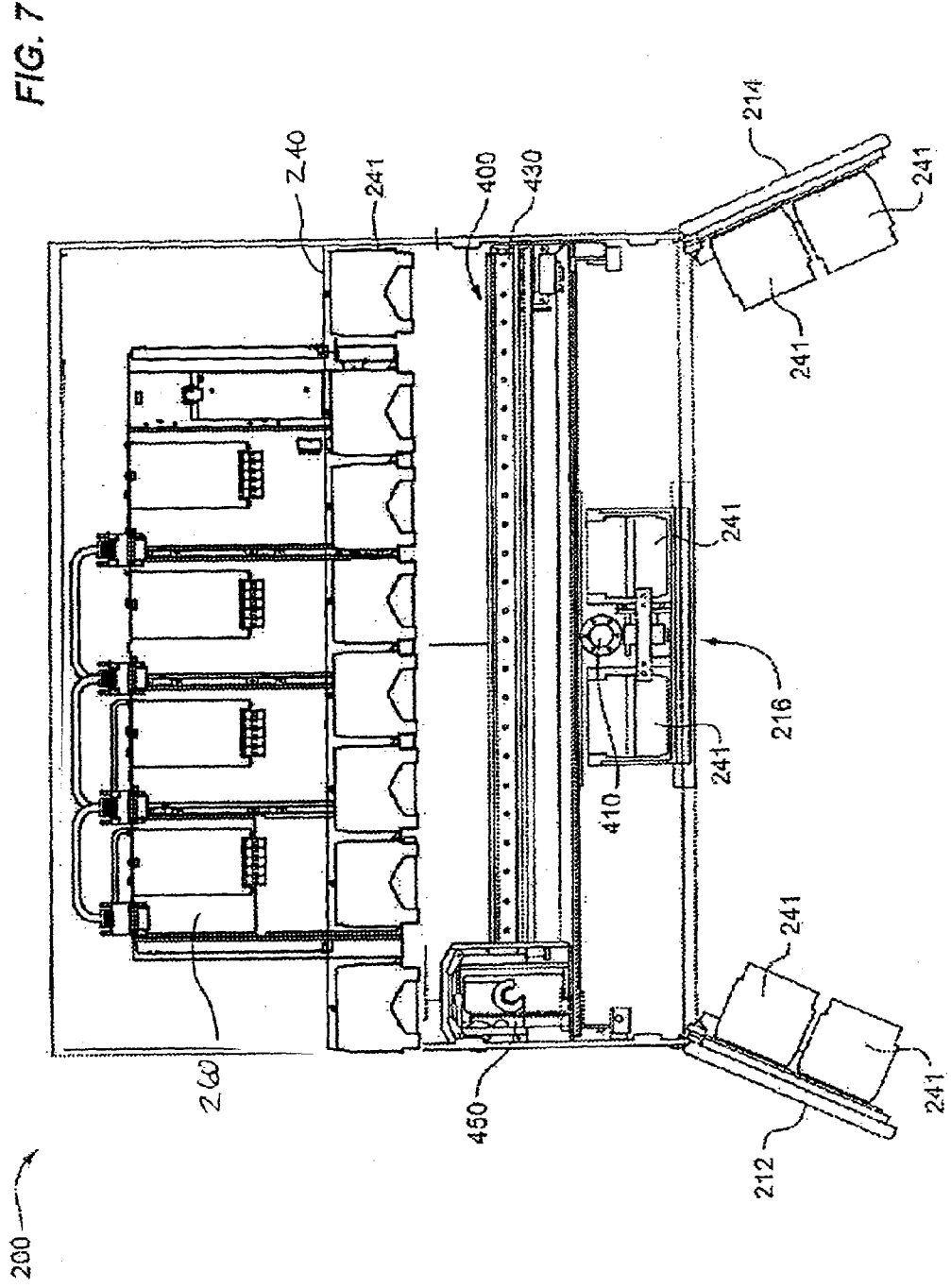
FIG. 7 illustrates a top view of the base unit with the left and right front doors in an open location.

FIGS. 6 & 7 illustrates a top view of base unit 200 with the right side door 212 and the left side door 214 in a closed and an open position, respectively. As illustrated, the robotic mechanism 400 travels between the data storage locations 241 located on the back wall 240 and the data storage locations 241 that are located on the center front panel 216, left front access door 212, and the right front access door 214. The rotatable gripper 450 swivels about an axis that is parallel to the vertical shaft 410 to provide access to the data storage locations located on the front panel 210 and the data read/write devices 260 located in the back wall 240.

Input/Output Ports

The center front panel 216 illustrated in FIG. 4A includes a control panel 220 for configuring and controlling the operation of and obtaining status from the base unit 200 and includes one or more input/output (I/O) ports 500 for importing and exporting data storage elements. The I/O ports 500 are located on the center panel 216, between the left and the right front access doors, 212 and 214, respectively.

Figure 8:
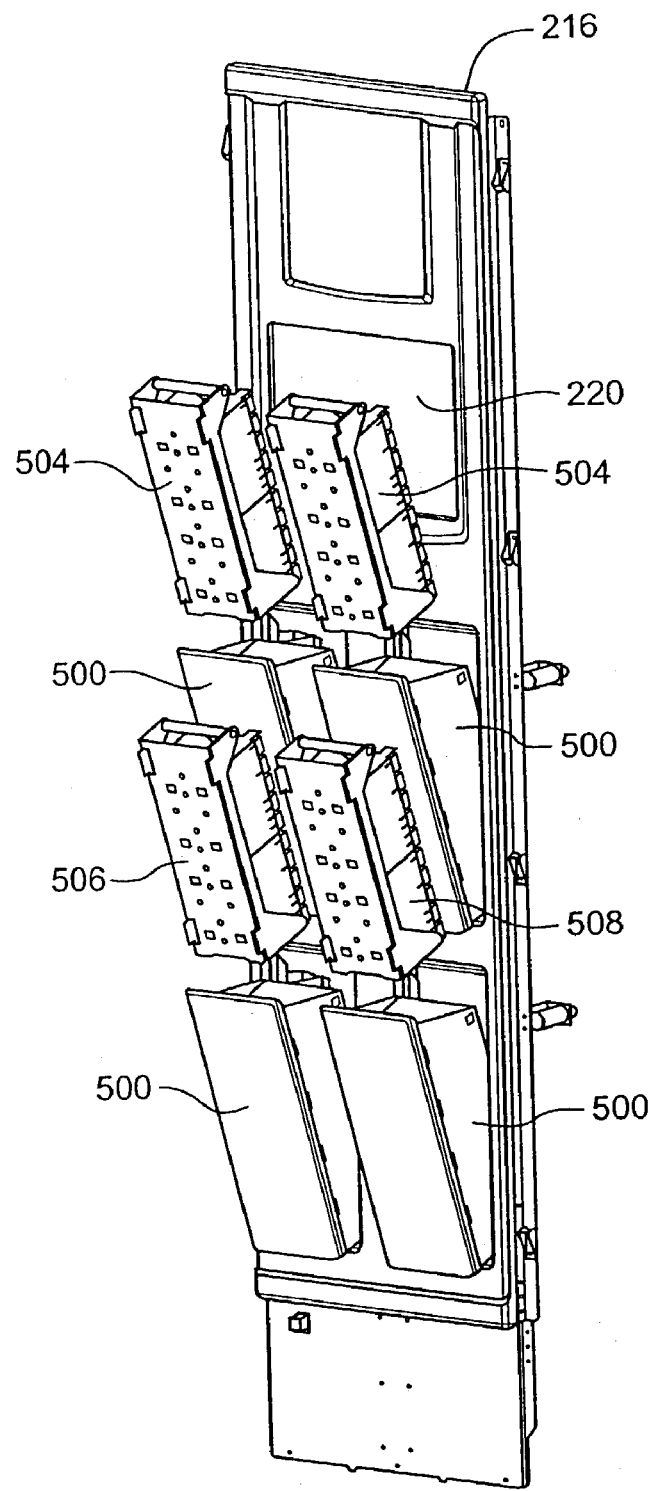
FIG. 8 illustrates the I/O ports located on the center panel between the left and right front doors with the magazine carrier shown outside the ports.

The I/O ports 500 provide an alternative method of inserting and extracting data storage elements 242 without interrupting the operation of the base unit 200. The data storage elements 242 may be housed in a magazine 502–508 as illustrated in FIG. 8 for importing and exporting data storage elements into and out of the base unit 200. The I/O ports make use of a tilt mechanism to enable an operator to slide a magazine 502–508 into the I/O ports 500, then close the I/O port 500 to enable the robotic mechanism 400 to access the data storage elements contained therein. One or more magazines 502–508 may be removed from the base unit 200 as illustrated in FIG. 8 to allow the operator to insert and/or extract one or more data storage elements into or from the magazines 502–508. While the base unit 200 is illustrated and described with four I/O ports 500 in the center front panel 216, the base unit 200 may be configured for an alternative number of I/O ports in alternative locations on the front panel 216 of the base unit 200.

Expansion Module

Figure 10:
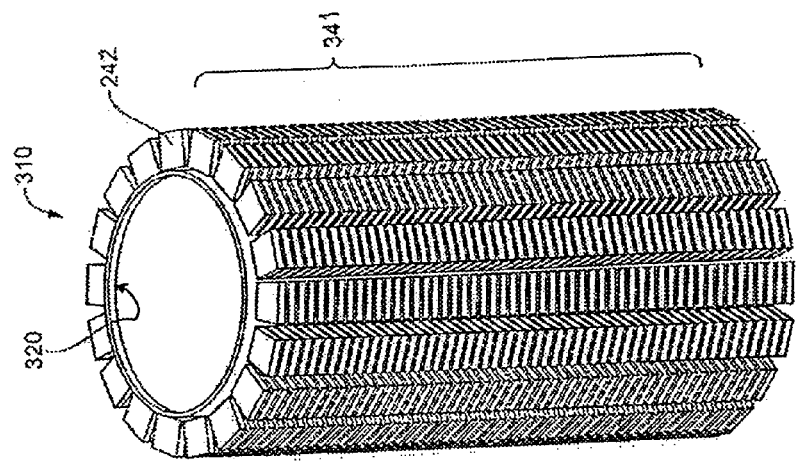
FIG. 10 illustrates a perspective view of the rotary carousel.
Figure 9:
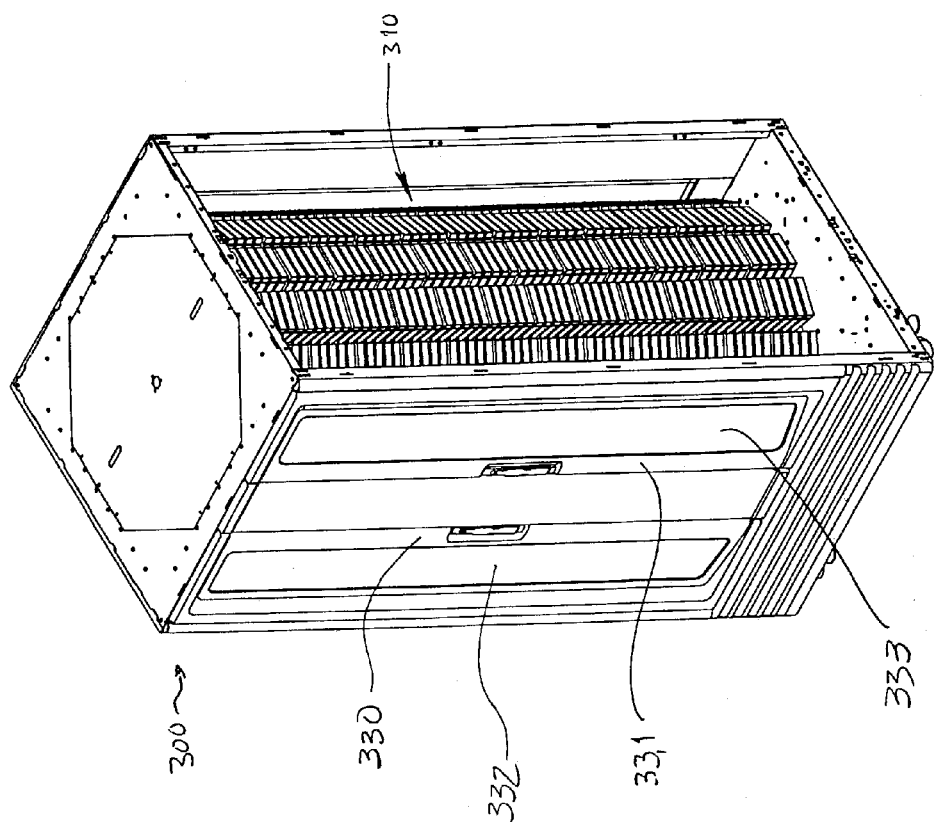
FIG. 9 illustrates a perspective view of an expansion module according to the present scalable automated data storage library system.

FIG. 9 illustrates a perspective view of the expansion module 300, which includes a rotary carousel 310 having a plurality of outwardly facing data storage locations 341, shown in FIG. 10, for housing a plurality of data storage elements 242. The expansion module 300 may also include left and right front doors 330, 331 for bulk loading of data storage elements 242 and windows 332, 333 for viewing the operation of the rotary carousel 310. The expansion module 300 is connected to an end of the base unit 200 as illustrated in FIG. 1 to increase the storage capacity of the scalable automated data storage library system 100. The rotary carousel 310 includes a plurality of outwardly facing data storage locations 341 on the outer surface of a cylindrical drum 320, creating a cylinder having a plurality of facets as illustrated in FIG. 10. The connection of the expansion module 300 to the base unit 200 includes an interface between the carousel drive mechanism (not shown) and the base unit processor (not shown) to allow the base unit processor to control the rotational movement of the rotary carousel 310. The side cover 301 (shown in FIG. 4A) of the base unit 200 is removed and replaced on to the end of expansion module 300 to allow the robotic mechanism 400 to access the data storage locations 341 on the rotary carousel 310 without requiring precise and critical alignment of the openings.

Figure 11:
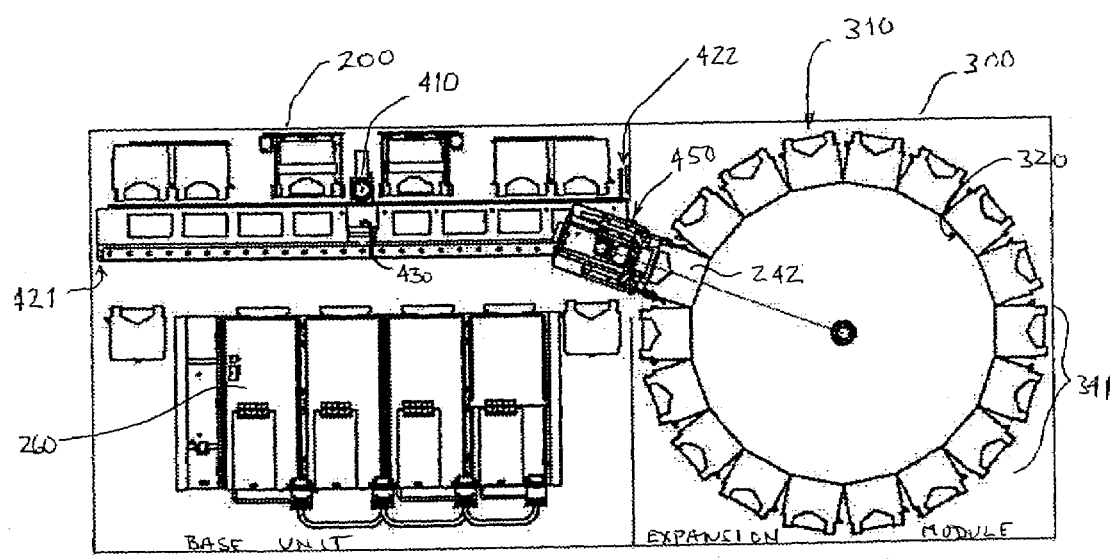
FIG. 11 illustrates a top view of the base unit robotic mechanism with respect to the rotary carousel within the adjacent expansion module according to the present scalable automated data storage library system.

The rotary carousel 310 within the expansion module 300 provides storage locations for housing a plurality of data storage elements in an array of rows and columns. When the data storage elements are ½ inch magnetic tape cartridges (such as LTO or SAIT), an 18-facet rotary carousel 310 may include data storage locations for up to 1072 half-inch tape cartridges. A robotic mechanism is not required for the expansion module 300; instead, the robotic mechanism 400 of the adjacent base unit 200 accesses the data storage elements in the rotary carousel 310 for moving data storage elements between the rotary carousel data storage locations 341 and the base unit data read/write devices 260. The rotatable gripper mechanism 450 of the robotic mechanism 400 reaches, in a combined X-axis and Z-axis motion, a minimal distance into the expansion module 300 as illustrated in FIG. 11 to provide access to the data storage locations 341 without requiring an extension of the robotic mechanism track 430 into the expansion module 300. In other words, access of data storage locations in the expansion module 300 by the base unit robotic mechanism 400 does not require additional tracks, extension of cabling or modification of the robotic mechanism drive system. Therefore, the present scalable automated data storage library system 100 eliminates the complex hardware additions or alignment procedures and modifications required for expanding prior art data automated data storage library systems.

Robotic Mechanism

The robotic mechanism 400 is located within the base unit 200 and has vertical and horizontal motions and includes a rotatable gripper mechanism 450. Referring to the top view of the base unit 200 and adjacent expansion module 300 of FIG. 11, the rotatable gripper mechanism 450 swivels about an axis that is parallel to the vertical shaft 410 and reaches along the Z axis to provide access to all interior surfaces of the base unit housing where data storage locations reside: in the rear wall 240, the front panel 210 and also the surface 320 in the rotary carousel(s) 310 within the adjacent expansion module(s) 300.

Horizontal track 430 extends the length of the base unit 200 from the left side 421 to the right side 422 as illustrated in FIGS. 5 & 11. When the adjacent expansion module 300 is attached to the base unit 200, the horizontal track 430 is not extended into the expansion module 300. However, the rotatable gripper mechanism 450 reaches a minimal distance into the expansion module 300 to allow the rotatable gripper mechanism 450 to access data storage elements 242 housed in the rotary carousel 310 as illustrated in FIG. 11.

Scalable Automated Data Storage Library System Configurations

The present scalable automated data storage library system 100 provides a base unit 200 which can be configured to include a combination of data read/write devices 260, data storage locations 241 for housing data storage elements 242, including I/O ports 502–508. The expansion module 300 includes a plurality of data storage locations 341 for housing a corresponding plurality of data storage elements 242. For installation, a left or right side cover of the base unit housing is removed and an open side of the expansion module 300 is connected to an open side of the base unit 200. Removing a side cover 301 of the base unit housing exposes the rotary carousel 310 for access by the robotic mechanism 400. The rotary carousel drive system is controlled by a base unit processor to rotate the rotary carousel 310 to the desired location. A combination of the rotation of the rotary carousel 310 and the swivel and reach of the rotatable gripper mechanism 450 form an effective method for moving data storage elements 242 from the adjacent rotary carousel 310 to a data read/write device 260 within the base unit 200. The movement of the rotary carousel 310 and the robotic mechanism 400 may be concurrently executed.

Figure 12A:
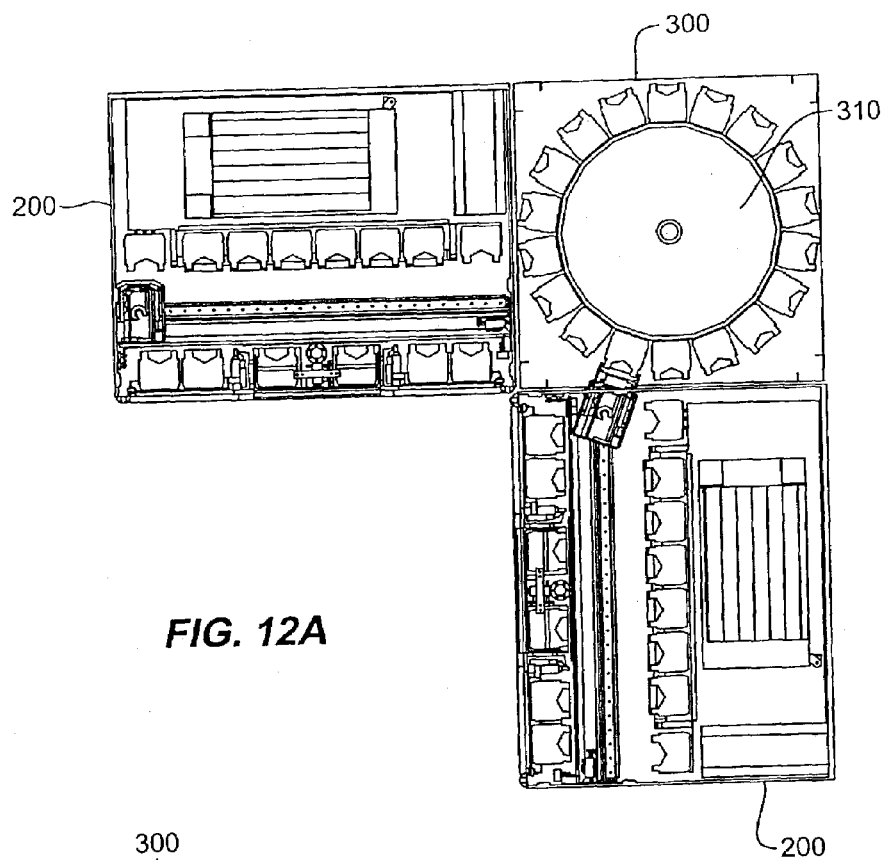
FIGS. 12A and 12B illustrate a top view and a perspective view, respectively, of a sample configuration of the present scalable automated data storage library system.
Figure 12B:
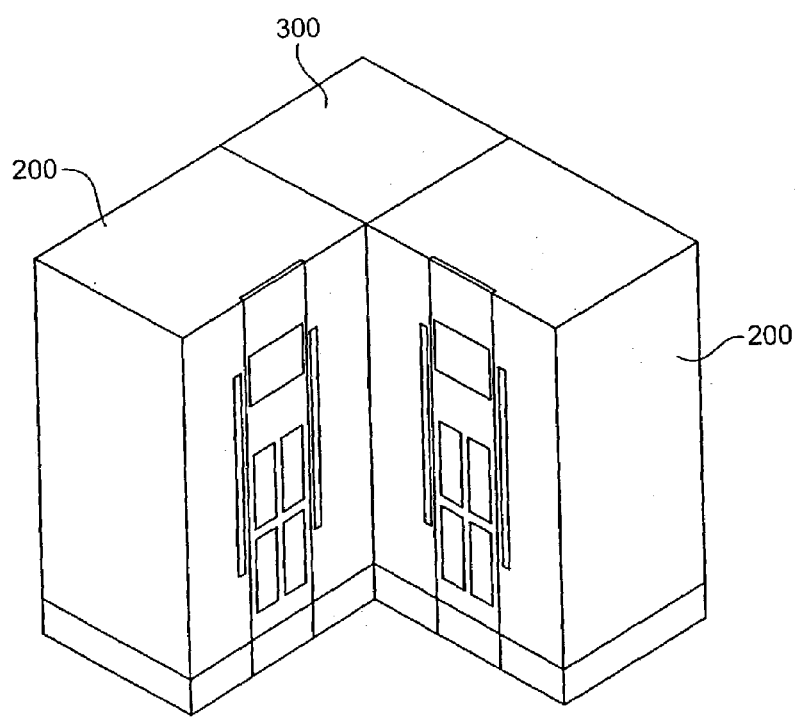
Figure 13A:
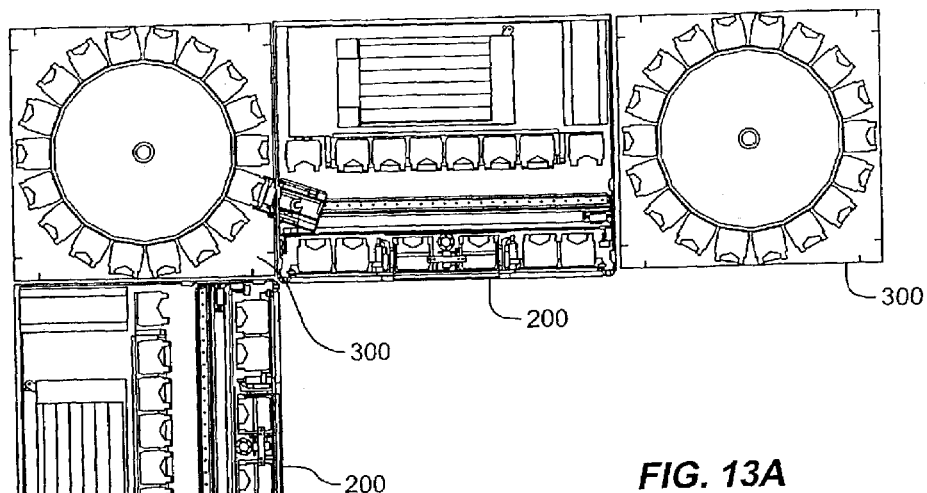
FIGS. 13A and 13B illustrate a top view and a perspective view, respectively, of another sample configuration of the present scalable automated data storage library system.
Figure 13B:
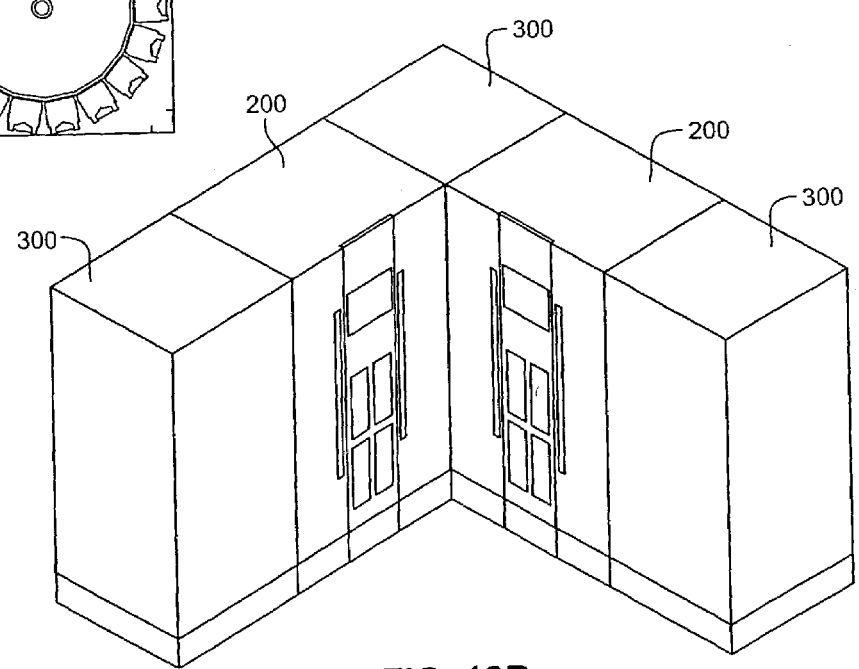
Figure 14:
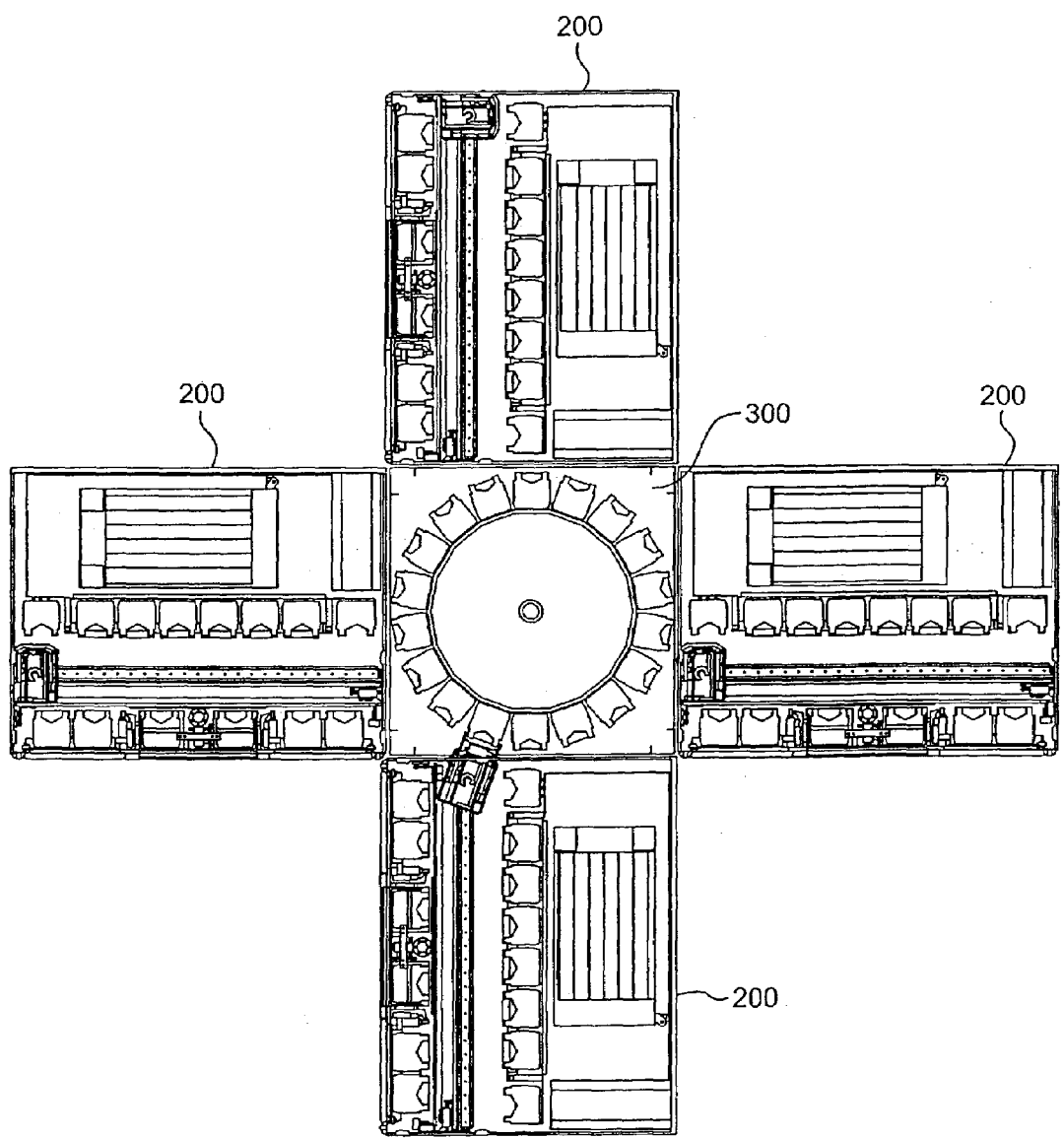
FIG. 14 illustrates a top view of the present scalable automated data storage library system in a star configuration.

While FIG. 1 illustrates the base unit 200 and two expansion modules 300 connected linearly, the simplicity of the construction of the base unit 200 and expansion module 300 allow alternative configurations. For example, an expansion module 300 may be located in a corner with a base unit 200 located on each side of the expansion module 300 in an L-shaped configuration as illustrated in FIGS. 12A and 12B. The configuration of FIGS. 12A and 12B may be expanded by adding an expansion module 300 next to one of the base units 200 or by adding an expansion module 300 adjacent to each of the two base units 200 as shown in FIGS. 13A and 13B. Alternatively, a single expansion module 300 may be connected with up to four base units 200 in a star configuration as illustrated in FIG. 14. In this configuration, each base unit robotic mechanism has access to the plurality of data storage elements housed within adjacent expansion modules 300.

Operationally

Figure 15:
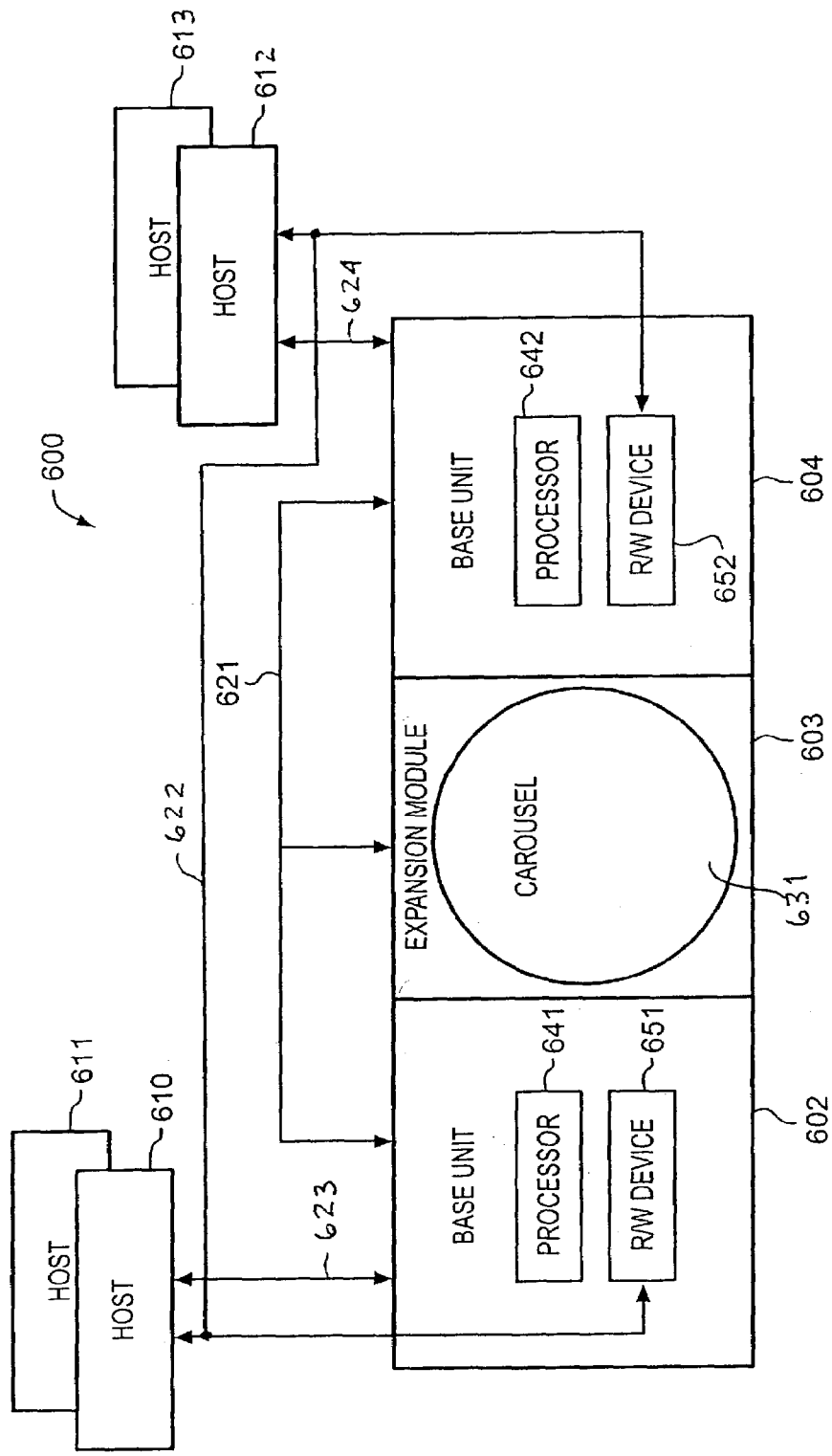
FIG. 15 illustrates a schematic block diagram of an operational configuration of the present scalable automated data storage library system.
Figure 16:
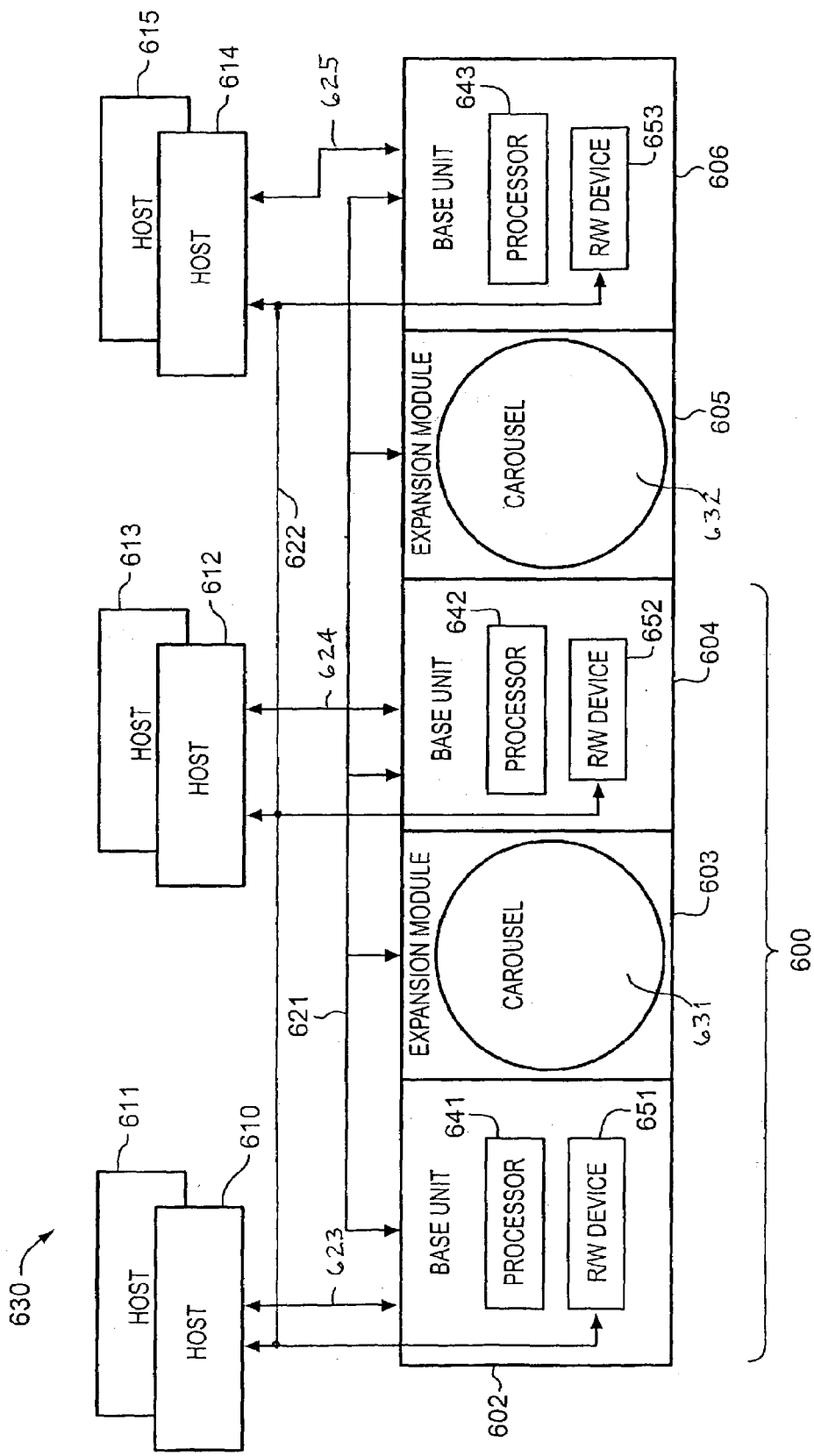
FIG. 16 illustrates a schematic block diagram of another alternative operational configuration of the present scalable automated data storage library system.

As shown in FIG. 15, one embodiment of the automated data storage library system 600 can consist of two base units 602 and 604 which are connected with a shared expansion module 603. The automated data storage library system 600 is also connected to one or more host computers 610–613 via control paths 623, 624 and is operable to mount data storage elements 242 into data read/write devices 651, 652 to enable the host computers 610–613 to control the operation of the data read/write devices 651, 652 to read and write data on to and from the rewriteable media contained within the data storage elements 242. When two or more base units 602 and 604 are connected with an expansion module 603 as illustrated in FIG. 15, the processors 641, 642 in the two base units 602, 604 function in a master-slave configuration. In other words, host processor 610 communicates with processor 641 which, in turn, controls the operation of the processor 642 and the rotation of the rotary carousel 631, within the expansion module 603, via control path 621 to enable the data storage elements to be loaded into the data read/write devices 651, 652. As base units 606 and/or carousels 605 are added, as shown in FIG. 16, to the automated data storage library system 600, the processor 641 is interconnected with the processor 643 located in the added base unit 606. The master processor 641 may include self-learning software to allow the master processor 641 to determine the configuration of the added base unit(s) and/or the added expansion module(s).

More than one host computer 610–613 may control the robotics and utilize the storage capacity of the automated data storage library system 600, as illustrated in FIG. 15 via data path 622 and local control path 621. In the example of FIG. 15, the storage capacity of the automated data storage library system 600 may be partitioned between the first host 610 and a second host 612. The first host 610 communicates with the processor 641 of base unit 602 and a second host 612 communicates with the processor 642 of the base unit 604. Base unit 602 controls the operation of the other base unit 604 and the rotation of the rotary carousel 631 within expansion module 603 via control path 621. First host 610 has access for reading and writing data to and from the data storage elements that are located within the base unit 602, expansion module 603 and base unit 604. The first host 610 can access data storage elements that are located within the base unit 602 and expansion module 603 via data path 622 to data read/write device 651 and can also separately access data storage elements 242 that are located within the base unit 604 and expansion module 603 via data path 622 to data read/write device 652. The second host 612 also can have access for reading and writing data to and from the data storage elements that are located within the base unit 602, expansion module 603 and base unit 604. The second host 612 can access data storage elements that are located within the base unit 602 and expansion module 603 via data path 622 to data read/write device 651 and can also separately access data storage elements 242 that are located within the base unit 604 and expansion module 603 via data path 622 to data read/write device 652. The partitioning of the data storage locations within expansion module 300 can be managed to satisfy the data storage needs of the various host computers. For example, a subset of the data storage locations within expansion module 300 can be dedicated for the use of host computer 610, and other subsets of data storage locations within expansion module 300 can be dedicated for the use of each of host computers 611–613.

This system configuration of FIG. 15 can be expanded by the addition of base unit 606 and expansion module 605 as shown in FIG. 16 so that host 610 may also access the data storage elements within the base unit 604 and second expansion module 605 via the local control path 621 and data path 622 to data read/write device 652 and separately access the data storage elements within the base unit 606 and second expansion module 605 via data path 622 to data read/write device 653. Similarly, hosts 614–615 can access data storage elements using the partitioning described above with respect to host 610.

SUMMARY

It is apparent that there has been described a scalable automated data storage library system that fully satisfies the objects, aims, and advantages set forth above. While the scalable automated data storage library system has been described in conjunction with specific embodiments thereof, it is evident that many alternatives, modifications, and/or variations can be devised by those skilled in the art in light of the foregoing description. Accordingly, this description is intended to embrace all such alternatives, modifications and variations as fall within the spirit and scope of the appended claims.

What is claimed is:

1. A scalable automated data storage library system comprising:
    a first base unit comprising:
        a first base housing;
        a plurality of data storage locations for storing data storage elements, and
        a first robotic mechanism traveling within said first base housing along both a horizontal axis and a vertical axis from a first end thereof to a second end thereof, said first robotic mechanism having a first swivelling gripper which swivels about said vertical axis to access said plurality of data storage locations in said first base unit;
    a first expansion module, comprising:
        a first expansion housing, and
        a first rotary carousel, located within said first expansion housing, and having a plurality of data storage locations, each accommodating a data storage element;
    a second base unit comprising:
        a second base housing;
        a plurality of data storage locations for storing data storage elements;
        a second robotic mechanism traveling within said second base housing along both a horizontal axis and a vertical axis from a first end thereof to second end thereof, said second robotic mechanism having a second swiveling gripper which swivels about said vertical axis to access said plurality of data storage locations in said second base unit;
    wherein said first base unit is connected on a first side to said first expansion module and said first swiveling gripper of said first robotic mechanism extends into said first expansion module and swivels to access said data storge locations in said first expansion module;
    wherein said second base unit is connected to said first expansion module and said second swiveling gripper of said second robotic mechanism extends into said first expansion module and swivels to access said data storage locations in said first expansion module; and
    wherein said first base unit and said second base unit are connected to adjacent sides of said first expansion module in a right angle configuration.

2. The scalable automated data storage library system of claim 1 further comprising:
   at least one read/write device, located in said first base unit, for enabling a host computer, connected to said at least one read/write device to read/write data on rewriteable media contained in said data storage elements, and
   wherein said first swiveling gripper of said first robotic mechanism access said at least one read/write device to transport data storage elements between said plurality of data storage locations and said at least one read/write device.

3. The scalable automated data storage library system of claim 1 further comprising:
   at least one read/write device, located in said second base unit, for enabling a host computer, connected to said at least one read/write device to read/write data on rewriteable media contained in said data storage elements, and
   wherein said second swiveling gripper of said second robotic mechanism access said at least one read/write device to transport data storage elements between said plurality of data storage locations and said at least one read/write device.

4. A scalable automated data storage library system comprising:
   a first base unit comprising:
   a first base housing,
   a plurality of data storage location for storing data storage elements, and
   a first robotic mechanism traveling within said first base housing along both a horizontal axis and a vertical axis from a first end thereof to a second end thereof said first robotic mechanism having a first swiveling gripper which swivels about said vertical axis to access said plurality of data storage locations in said first base unit,
   a first expansion module, comprising:
   a first expansion housing, and
   a first rotary carousel located within said first expansion housing, and housing a plurality of data storage locations, each accommodating a data storage element;
   a second base unit comprising:
   a second base housing;
   a plurality of data storage locations for storing data storage elements;
   a second robotic mechanism traveling within said second base housing along both a horizontal axis and a vertical axis from a first end thereof to a second end thereof, said second robotic mechanism having a second swiveling gripper which swivels about said vertical axis to access said plurality of data storage locations in said second base unit;
   wherein said first robotic mechanism is connected to said first expansion module and said first swiveling gripper of said first robotic mechanism extends into said first expansion module and swivels to access said data storage locations in said first expansion module;
   wherein said second base unit is connected to said first expansion module and said second swiveling gripper of said second robotic mechanism extends into said first expansion module and swivels to access said data storage locations in said first expansion module; and
   wherein said first base unit and said second base unit are connected to opposing sides of said first expansion module in a linear configuration.

5. A scalable automated data storage library system comprising:
   a first unit comprising:
   a first base housing;
   a plurality of data storage locations for storing data storage elements; and
   a first robotic mechanism traveling with said first base housing along both a horizontal axis and a vertical axis from a first end thereof to a second end thereof, said first robotic mechanism having a first swiveling gripper which swivels about said vertical axis to process said plurality of data storage locations in said first base unit;
   a first expansion module, comprising:
   a first expansion housing, and
   a first rotary carousal, located within said first expansion housing, and having a plurality of data storage locations, each accommodating a data storage element;
   a second base unit comprising:
   a second base housing;
   a seond robotic mechanism traveling within aid second base housing along both a horizontal axis and a vertical axis from a first end thereof to a second end thereof said second robotic mechanism having a second swiveling gripper which swivels about said vertical axis to access said plurality of data storage locations in said second base unit;
   a third base unit comprising:
   a third base unit housing;
   a plurality of data storage locations for storing data storage elements, and
   a third robotic mehanism traveling within aid third base housing along both horizontal axis and a vertical axis from a first end thereof to a second end thereof, said third robotic mechanism having a third swiveling gripper which swivels about said vertical axis to access said plurality of data storage loations in said third base unit;
   wherein said first robotic mechanism is connected to a first side of said first expansion module and said first swiveling gripper of said first robotic mechanism extends into said first expansion module and swivels to access said data storage locations in said first expansion module;
   wherein said second base unit is connected to a second side of said first expansion module and said second swiveling gripper of said second robotic mechanism extends into said first expansion module and swivels to access said data storage locations in said first expansion module; and
   wherein said third base unit connected to a third side of aid first expansion module, said first, second and third base units being connected in said first expansion module in a star configuration, wherein said third swiveling gripper extends into said first expansion module to access said data storage locations in said first expansion module.

6. The scalable automated data storage library system of claim 5 further comprising:
   a fourth base unit comprising:
   a fourth base unit housing;
   a plurality of data storage locations for storing data storage elements, and
   a fourth robotic mechanism traveling within said fourth base housing along both a horizontal axis and a vertical axis from a first end thereof to a second end thereof, said fourth robotic mechanism having a fourth swiveling gripper which swivels about said vertical axis to access said plurality of data storage locations in said fourth base unit; and wherein said fourth base unit is connected to a fourth side of said first expansion module in a star configuration, wherein said fourth swiveling gripper extends into said first expansion module to access said data storage locations in said first expansion module.

7. The scalable automated data storage library system of claim 4 further comprising:

at least one read/write device, located in said second base unit, for enabling a host computer, connected to said at least one read/write device to read/write data on rewritable media contained in said data storage elements, and wherein said second swiveling gripper of said second robotic mechanism access said at least one read/write device to transport data storage elements between said plurality of data storage locations and said at least one read/write device.

8. The scalable automated data storage library system of claim 1 wherein said first base unit further comprises a first means for controlling said first robotic mechanism and a rotation of said first rotary carousel within said first expansion module.

9. The scalable automated data storage library system of claim 4 further comprising:

at least one read/write device, located in said first base unit for enabling a host computer, connected to said at least one read/write device to read/write data on rewriteable media contained in said data storage elements; and wherein said first swiveling gripper of said first robotic mechanism access said at least one read/write device to transport data storage elements between said plurality of data storage locations and said at least one read/write device.

10. The scalable automated data storage library system of claim 5 further comprising:

at least one read/write device, located in said first base unit, for enabling a host computer, connected to said at least one read/write device to read/write data on rewritable media contained in said data storage elements; and wherein said first swiveling gripper of said first robotic mechanism access said at least one read/write device to transport data storage elements between said plurality of data storage locations and said at least one read/write device.

11. The scalable automated data storage library system of claim 5 further comprising:

at least one read/write device, located in said second base unit, for enabling a host computer, connected to said at least one read/write device to read/write data on rewritable media contained in said data storage elements; and wherein said second swiveling gripper of said second robotic mechanism access said at least one read/write device to transport data storage elements between said plurality of data storage locations and said at least one read/write device.

12. The scalable automated data storage library system of claim 5 further comprising:

at least one read/write device, located in said third base unit for enabling a host computer, connected to said at least one read/write device to read/write data on rewritable media contained in said data storage elements; and wherein said third swiveling gripper of said third robotic mechanism access said at least one read/write device to transport data storage elements between said plurality of dta storage locations and said at least one read/write device.

13. The scalable automated data storage library system of claim 6 further comprising:

at least one read/write device, located in said fourth base unit, for enabling a host computer, connected to said at least one read/write device to read/write data on rewritable media contained in said data storage elements; and wherein said third swiveling gripper of said fourth robotic mchanism acess said at least one read/write device to transport data storage elements between said plurality of data storage locations and said at least one read/write device.

14. The scalable automated data storage library storage system of claim 3 wherein said second base unit further comprises a second means for controlling said second robotic mechanism and a rotation of said first rotary carousel within said first expansion module.

15. The scalable automated data storage library system of claim 4 wherein said first base unit futher comprises a first means for controlling said first robotic mechanism and a rotation of said first rotary carousel within said first expansion module.

16. The scalable automated data storage library system of claim 4 wherein said second base unit futher comprises a second means for controlling said second robotic mechanism and a rotation of said first rotary carousel within said first expansion module.

17. The scalable automated data storage library system of claim 5 wherein said first base unit further comprises a first means for controlling said first robotic mechanism and a rotation of said first rotary carousel within said first expansion module.

18. The scalable automated data storage library system of claim 5 wherein said second base unit further comprises a second means for controlling said second robotic mechanism and a rotation of said first rotary carousel within said first expansion module.

19. The scalable automated data storage library system of claim 5 wherein said third base unit further comprises a third means for ontrolling said third robotic mechanism and a rotation of said first rotary carousel within said first expansion module.

20. The scalable automated data storage library system of claim 5 wherein said fourth base unit further comprises a fourth means for controlling said fourth robotic mechanism and a rotation of said first rotary carousel within said first expansion module.

21. The scalable automated data storage library system of claim 1 further comprising:

a second expansion module, comprising:

a second expansion housing, and a second rotary carousel, located within said second expansion housing, and having a plurality of data storage locations each accommodating a data storage element; and wherein said second expansion module is connected on a second side to said first base unit and said first swiveling gripper of said first robotic mechanism extends into said second expansion module and swivels to access said data storage locations in said second expansion module.

22. The scalable automated data storage library system of claim 21 further comprising:

a third expansion module comprising:
  a third expansion housing, and
  a third rotary carousel, located within said third expansion housing, and having a plurality of data storage locations each accommodating a data storage element; and p1 wherein said third expansion module is connected on a second side to said second base unit and said second swiveling gripper of said second robotic mechanism extends into said third expansion module and swivels to access said data storage locations in said third expansion module.

23. The scalable automted data storage library system of claim 4 further comprising:
  a second expansion module comprising:
    a second expansion housing, and
    a second rotary carousel, located within said second expansion housing, and having a plurality of data storage locations each accommodating a data storage element; and
  wherein said second expansion module is connected on a first side to said first base unit and said first swiveling gripper of said first robotic mechanism extends into said second expansion module and swivels to access said data storage locations in said second expansion module.

24. The scalable automated data storage system of claim 23 further comprising:
  a third base unit comprising:
    a third base unit housing,
    a plurality of data storage locations for storing data storage elements, and
    a third robotic mechanism traveling within said third base housing along both a horizontal axis and a vertical axis from a first end thereof to a second end thereof, said third robotic mechanism having a third swiveling gripper which swivels about said vertical axis to access said plurality of data storage locations in said third base unit;
  wherein said third base unit connected to a second side of said second suspension module, said first, second and third base units being connected to aid first expansion module, wherein said third swiveling gripper extends into said second expansion module to access said data storage locations in said second expansion module.

25. The scalable automated data storage library system of claim 24 further comprising:
  at least one read/write device, located in said third base unit, for enabling a host computer, connected to said at least one read/write device to read/write data on rewritable media contained in said data storage element; and
  wherein said third swiveling gripper of said third robotic mechanism access said at least one read/write device to transport data storage elements between said plurality of data storage locations and said at least one read/write device.

26. The scalable automated data storage library system of claim 24 wherein said third base unit further comprises a third means for controlling said third robotic mechanism and a rotation of said second rotary carousel within said second expansion module.

* * * * *